Figure 1:
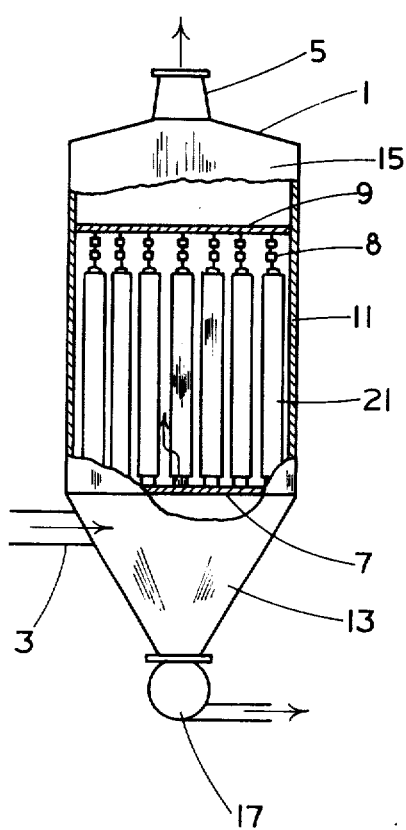

United States Patent [19]

O'Dell

[11] 4,003,727
[45] Jan. 18, 1977

[54] TUBULAR FILTER CONNECTOR

[75] Inventor: Leonard J. O'Dell, Louisville, Ky.

[73] Assignee: American Air Filter Company, Inc., Louisville, Ky.

[22] Filed: July 2, 1975

[21] Appl. No.: 592,539

[52] U.S. Cl. .................................. 55/377; 55/378; 55/507; 55/DIG. 26; 285/239
[51] Int. Cl.² ...................................... B01D 46/02
[58] Field of Search ............... 55/341 Nt, 374–378, 55/507, 505, 341 R, 341 MC, 341 PC, 341 HM, 341 M, 341 H, 498, DIG. 26; 285/238–241, 260

[56] References Cited
UNITED STATES PATENTS

| | | | |
|---|---|---|---|
| 1,835,093 | 12/1931 | Ruemelin | 55/378 X |
| 2,885,028 | 5/1959 | Sylvan | 55/374 |
| 3,186,147 | 6/1965 | O'Dell | 55/374 |
| 3,224,172 | 12/1965 | Eiben | 55/375 X |
| 3,451,197 | 6/1969 | Ballard | 55/341 NT |
| 3,812,660 | 5/1974 | Vandenhoeck | 55/378 |

Primary Examiner—Frank W. Lutter
Assistant Examiner—Kathleen J. Prunner

[57] ABSTRACT

An improved arrangement for releasably connecting an end of a tubular gas filter bag to an aperture in an apertured plenum chamber plate member including a mounting member mounted in the aperture in the plate member for releasable engagement with the end of the bag. The mounting member includes an inwardly extending ledge located between an outwardly extending flange which engages the end of the bag and an inwardly extending seat which rests upon the periphery of the aperture. The ledge enables easy mounting of the bag end, which contains an expansible slip ring, over the flange.

3 Claims, 2 Drawing Figures

TUBULAR FILTER CONNECTOR

BACKGROUND OF THE INVENTION

The present invention relates to gas separation apparatus and more particularly to a releasably connecting arrangement for connecting the end of a filter bag to an apertured plate member.

Various arrangements are known in the art for connecting the ends of filter bags to apertured plate members of plenums in gas separating apparatuses. For the most part the past arrangements have been complex in design and construction, as well as expensive in manufacture and erection, quite often failing to effect a fast connection.

The present invention provides a economical, straightforward arrangement which can be readily manufactured with a minimum of parts and a minimum of steps, and which, at the same time, permits rapid releasable connection of a filter bag into an aperture of a plate member of a plenum chamber to hold the bag end in position during gas treating operations.

Various other features of the present invention will become obvious to one skilled in the art upon reading the disclosure set forth hereinafter.

SUMMARY OF THE INVENTION

More particularly, the present invention provides, in a baghouse arrangement for filtering particulate matter from a gaseous stream including at least one plenum having an apertured member for gas passing therethrough and at least one tubular filter bag with one of its ends connected to the plate in flow through communication with the plenum, the improvement comprising: a mounting member having a radially outwardly extending flange at its upper extremity in flow-through communication with one end of the tubular filter bag and a radially inwardly extending section with a vertically downwardly extending portion at its lower extremity, the diameter of the vertically downwardly extending section being less than the diameter of the aperture and received therein; and, the tubular filter bag including means at its lower extremity releasably securing the tube to the outwardly extending flange of the mounting member.

It is to be understood that the description of the examples of the present invention given hereinafter are not by way of limitation. Various modifications within the scope of the present invention will occur to those skilled in the art upon reading the disclosure set forth hereinafter.

Figure 2:
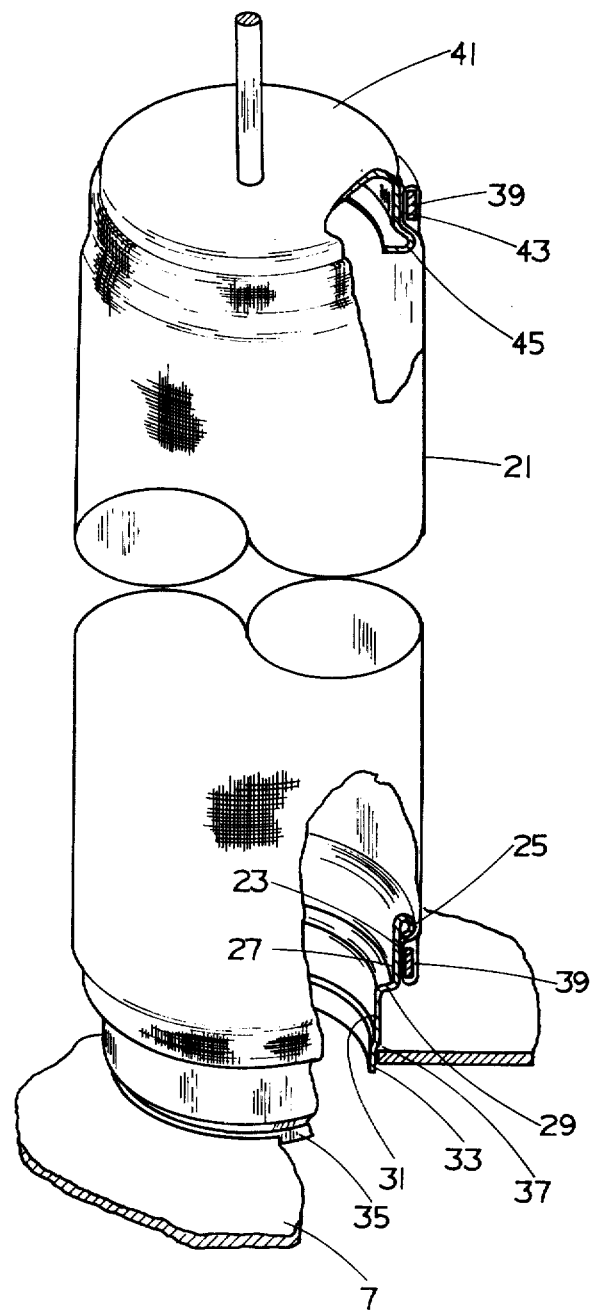

Referring to the drawing:

FIG. 1 is an elevational view, in section, of an apparatus in accordance with the present invention; and, FIG. 2 is an enlarged view in perspective, partially cut-away, of a filter bag of FIG. 1, disclosing one end of the bag in engagement with an apertured plate member, such end incorporating the novel construction of the present invention.

As shown in FIG. 1, a gas cleaning arrangement incorporating the present invention includes a housing 1 having a dirty gas inlet 3 and a clean gas outlet 5. Spaced apart transverse apertured plate members 7 and 9 divide housing 1 into a gas treating chamber 11, in-flow chamber or hopper 13 and an off-take chamber 15, the dirty gas inlet 3 communicating with the off-take chamber 15. The dirty gas inlet 3 is positioned to enter the top portion of the hopper 13, hopper 13 being provided with control valve 17 at the lower portion thereof for removal of particulate matter therefrom. Gas treating chamber 11 is provided with a plurality of filter bags 21 which can be made of any one of several suitable gas impervious materials that is known in the art. Advantageously, a temperatuare resisting glass fiber material such as glass fibers can be used.

The filter bags 21 are suspended by any known means from the apertured plate member 9, such as a spring loaded releasable connector 8, wherein the filter bags may be cleaned by a mechanical shaking device (not shown) or by reversing the flow of fluid through the gas treating chamber 11. It is to be understood that other methods for cleaning the filter tubes known in the art may be applied to the apparatus of the present invention.

Referring to FIG. 2 of the drawing, a releasable connector arrangement is shown for connecting a tubular filter bag 21 to apertured plate 7. The releasable connecting arrangement includes a ring-shaped mounting member 23, the mounting member 23 being made from any one of several suitable metal or plastic materials. The mounting member 23 has a radially outwardly extending curved flange portion 25 at its upper extremity and a vertically downwardly extending portion 27 disposed between a radially inwardly extending ledge portion 29 and the outwardly extending flange portion 25. The ledge portion 29 extends vertically downward as indicated by the numeral 31 and connects with a downwardly extending neck portion 33 with seat 37 disposed therebetween. The downwardly extending neck portion 33 extends downward a short distance and is received within the aperture 35 of the plate member 7. The circumferential seat portion 37 which is disposed between the neck 33 and the downwardly extending portion 31 rests upon the periphery of the aperture 35. The downwardly extending neck portion 33 has an outer diameter less than the diameter of the aperture 35 in the plate member 7 whereby neck portion 33 is received within aperture 35. Neck portion 33 which is slidably received within aperture 35 is generally attached thereto by welding. However, gasketing material or other sealants may be inserted around the outer periphery of the neck portion 33 and the aperture 35 to provide a fluid tight seal. Furthermore, neck portion 33 may be flared outwardly to provide a secure holding means to the plate member.

The filter bag 21, being open at both ends, is attached to an expansible slip ring 39 at each end, slip ring 39 being made from any one of several suitable flexible, spring like metallic or plastic materials. Filter bag 21 being generally a temperature resisting glass fiber material is generally overlapped around the ring 39, ring 39 being held in place by stitching, taping, or any other well known attaching means. One end of the tubular filter bag 21 is slipped over the outwardly extending flange portion 25 of the ring mounting member 23 as the diameter of the slip ring 39 is less than the outer diameter of the flange portion 25 and is held securely in place thereby. Inwardly extending ledge 29 is provided to enable easy mounting of the bag 21 over the flange portion 25 the inwardly extending ledge 29 providing room for the thumb of the operator when pulling the bag 21 including the slip ring 39 over and then under the flange portion 25. The opposite end of the tubular filter bag 21 including the other slip ring 39 is slipped over the cap 41 which includes a downwardly extending portion 43 with an outwardly extending flange portion 45, the outwardly extending flange portion 45 having a diameter greater than the diameter of the slip ring 39.

Thus, it will be realized that various changes may be made to the specific embodiment shown and described without departing from the scope and spirit of the present invention.

What is claimed is:

1. In a baghouse arrangement for filtering particulate matter from a gaseous stream including at least one plenum having an apertured member for gas passage therethrough and at least one vertically extending tubular filter bag with one of its ends connected to said apertured member in flow-through communication with said plenum, the improvement comprising:

a flow-through elongated mounting member having a vertically extending portion with a radially outwardly extending flange at one end thereof in communication with said one end of said tubular filter bag, a radially inwardly extending seat at the opposed end thereof with a vertically downwardly extending portion terminating at its lower extremity, the vertically downwardly extending portion being received by the aperture in said apertured member such that the seat rests upon the periphery of the aperture, said vertically downwardly extending portion between said flange and said radially inwardly extending seat being defined by two vertically extending offset sections connected by a radially inwardly extending ledge portion; and, said one end of said tubular filter bag having a means releasably securing said tubular filter bag to said flange of said mounting member.

2. The apparatus of claim 1, said means releasably securing said tubular filter bag to said flange including an expansible slip ring said slip ring having tubular filter material overlapped around said slip ring and attached thereto, said slip ring having a diameter less than the outer diameter of said flange portion, said slip ring being disposed on the underside of said flange portion.

3. The apparatus of claim 1, said mounting member being fixedly attached to said apertured member.

* * * * *